Aug. 6, 1935.  LE ROY J. LEISHMAN  2,010,307
MEANS AND METHOD FOR COLORING LIGHT FORMED IMAGES
Filed June 6, 1931  5 Sheets-Sheet 1
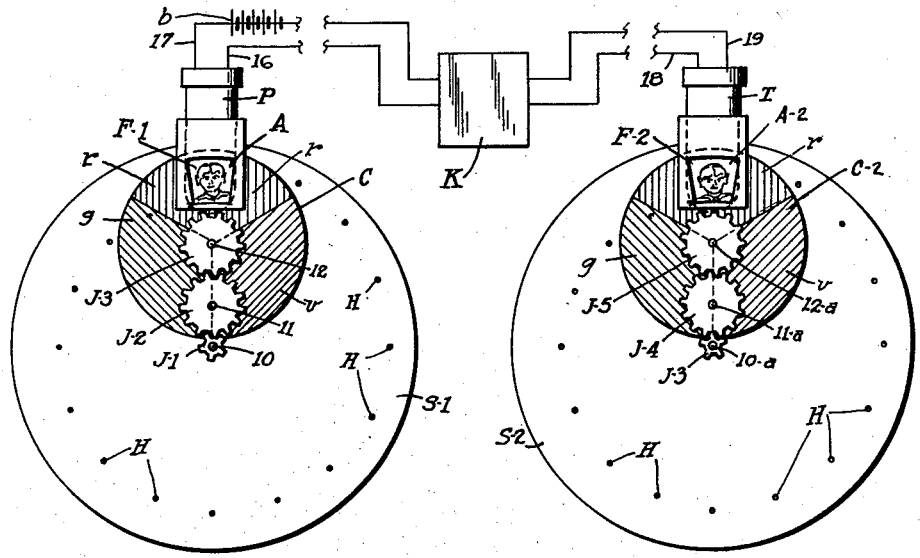
Fig. 1   Fig. 2
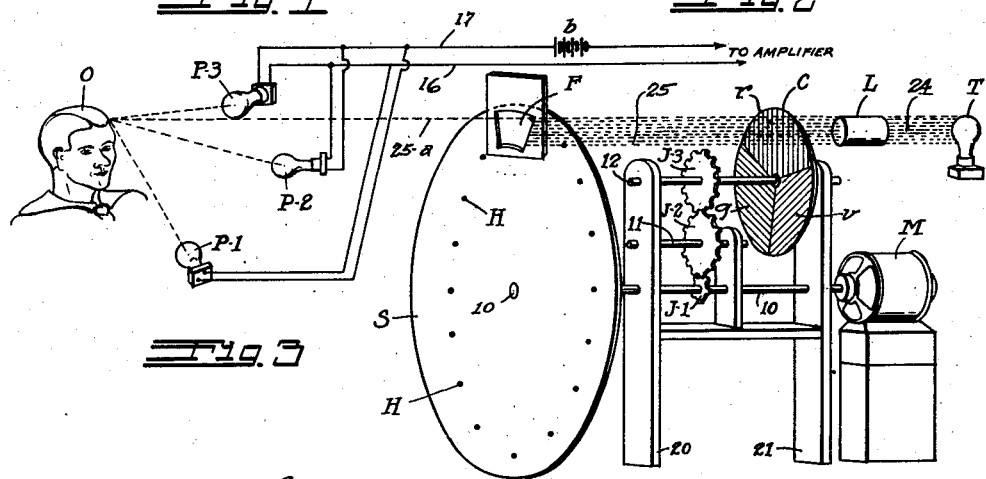
Fig. 3
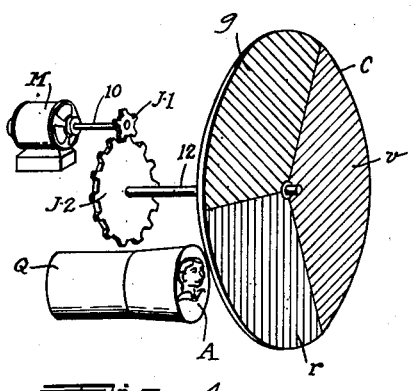
Fig. 4
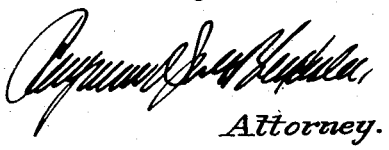
Inventor:
Le Roy J. Leishman,
By
Attorney.

Aug. 6, 1935.  LE ROY J. LEISHMAN  2,010,307
MEANS AND METHOD FOR COLORING LIGHT FORMED IMAGES
Filed June 6, 1931  5 Sheets-Sheet 2
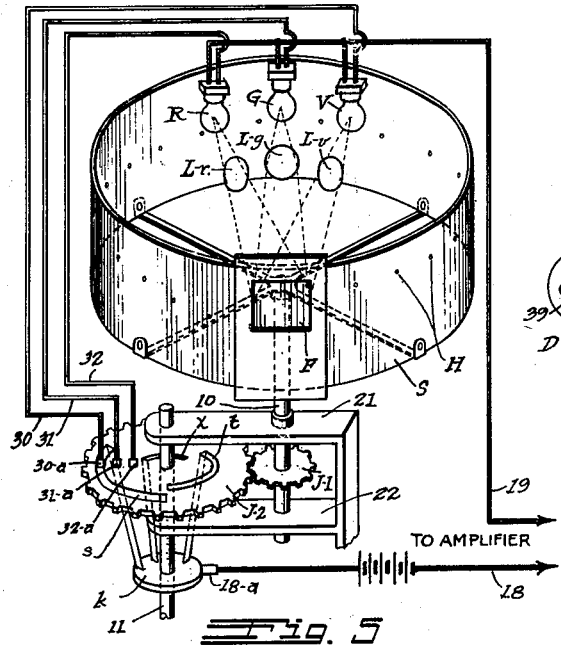
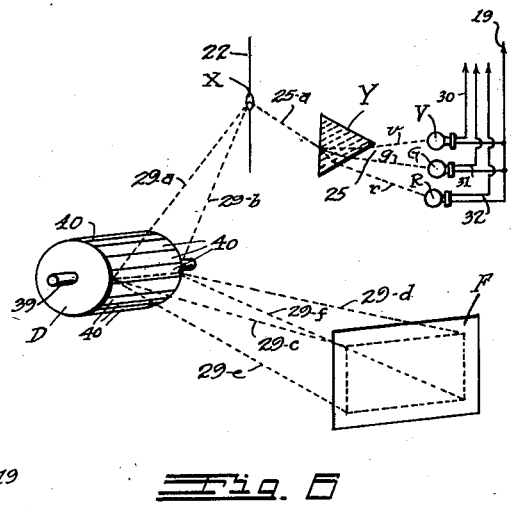
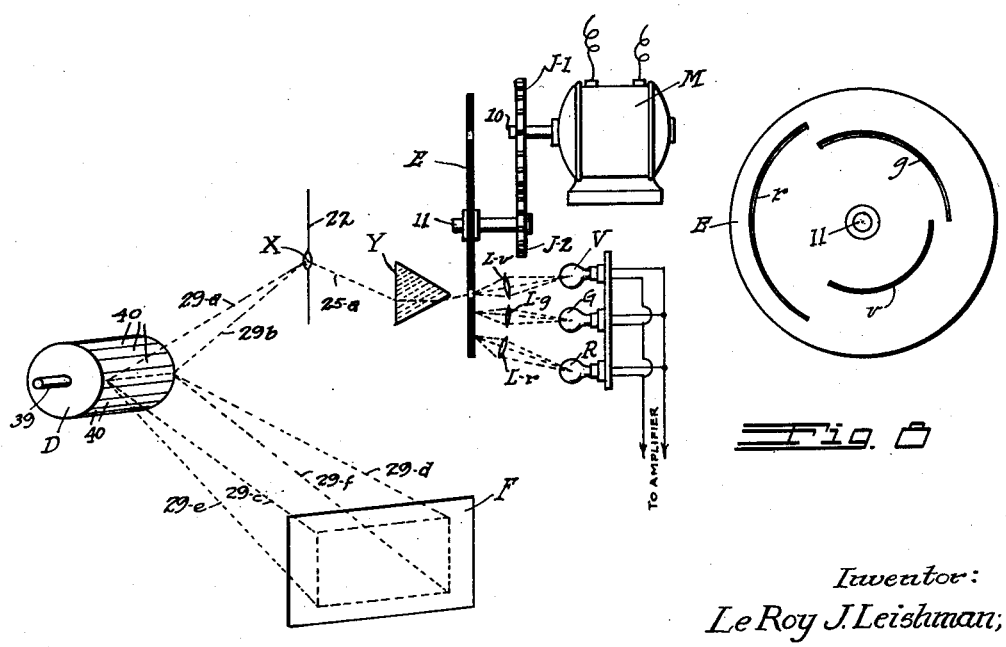
Inventor:
Le Roy J. Leishman;
Attorney.

Aug. 6, 1935.   LE ROY J. LEISHMAN   2,010,307
MEANS AND METHOD FOR COLORING LIGHT FORMED IMAGES
Filed June 6, 1931   5 Sheets-Sheet 3

Inventor:
Le Roy J. Leishman,
By Raymond G. Mullally
Attorney.

Aug. 6, 1935.  LE ROY J. LEISHMAN  2,010,307
MEANS AND METHOD FOR COLORING LIGHT FORMED IMAGES
Filed June 6, 1931  5 Sheets-Sheet 4

Inventor:
Le Roy J. Leishman,
By
Attorney.

Aug. 6, 1935.    LE ROY J. LEISHMAN    2,010,307
MEANS AND METHOD FOR COLORING LIGHT FORMED IMAGES
Filed June 6, 1931    5 Sheets-Sheet 5

Inventor:
LeRoy J. Leishman,
By [signature]
Attorney.

Patented Aug. 6, 1935

2,010,307

UNITED STATES PATENT OFFICE 2,010,307

MEANS AND METHOD FOR COLORING LIGHT FORMED IMAGES

Le Roy J. Leishman, Los Angeles, Calif.

Application June 6, 1931, Serial No. 542,606

20 Claims. (Cl. 178—6)

This invention relates to improvements in coloring light-formed images, replicas of objects and scenes made visible at a location distant from the objects and scenes and possibly at a later time, as in television, motion pictures and the like, and more particularly for producing the light-formed images in their natural colors.

The objects are to color light-formed images and particularly adapted to television reception, the means being applicable to any now known scanning means or receiver without alteration, or, at most, by the addition of simple parts; provide apparatus without complexity, reliable, low in cost, and which in addition to producing images in their natural colors will also give clear definition thereof. Other objects will appear as this specification proceeds.

While the more specific use is for showing pictures and images transmitted from television sending stations to receiving sets, the possible applications may be many. In the subsequently described instrumentalities and methods, illustrative of the invention, the adaptations and references are directed to television methods and appliances, though invention has no such limitations. However, since the application to television is, possibly, a more complex adaptation, descriptions and drawings herein are addressed specifically to that art.

It is well-known that by use of a light-responsive device, as a photo-electric cell, at the transmitting apparatus whereby the light forming the image is modulated to produce the image at a distance away from the transmitting apparatus, and by having an illuminating means at the receiving station which is adapted to be modulated in accordance with the change in condition of the light-responsive device, and these two appliances are each associated with a scanning means, images may be transmitted in varying shades and tints of black and white. If the image at the transmitting apparatus be illuminated by a colored light and the reflection therefrom falls on a light-responsive device, while a similar color be given to the modulated light at the receiving position, the image there shown will appear in that particular selected color. The natural colors are built up of three fundamental colors, namely, red, green and blue-violet; so that if these three colors be successively imparted to a received picture or image within the small time period during which the persistence of vision will hold, the image so successively colored will appear to the eye in all the natural colors.

While methods and appliances have been devised for imparting color to certain light-formed images and replicas of objects, these, so far as known to applicant, have been confined to the use of pigmented color filters in which the colors are not pure colors or shades and tints thereof because of impurities in pigments or transparent supporting media which, up to the present time, seem impossible of correction. Hence, although I disclose artificially pigmented light coloring means, I show and prefer the use of colors obtained from white or polychromatic light, free from pigments or artificial colors and which are imparted to the images and replicas without interposition of a support or carrier through which the said natural, pure colors must pass. Hence, these colors, as abstracted from light itself and in their natural purity impart their fundamentals and blends and combinations thereof, to the retina.

As will later appear, the preferred sources of colors to be imparted to the images are obtained from dispersion of multichrome light, and from the spectrum, thus obtained, selected color strips or bands are so directed and controlled that the selected colors are successively imparted to the image, or the colors may be obtained by polarization of white (polychrome) light and subjecting the polarized light to electro-magnetic or electrostatic stresses under which influences a single color will be derived from the polarized light, the color depending on the degree of the etheric or molecular stress applied. In any one of the three color sources selected, the color derived is pure, free from the defects inherent in pigments, and they blend into natural shades and tints to produce the optical effect of many more colors than the three actually imparted to the light-formed pictures or images.

It has been found that in various kinds of apparatus and different physical experiments, persistence of vision will endure for about one-sixteenth of a second, and this time period has been adopted in general for television work, and in certain classes of illumination. In ordinary black and white transmitted images, the scanning disc or drum is usually arranged to be driven at a speed such that it makes one rotation in one-sixteenth of a second. However, if three successive colors are to be added to a transmitted picture, it is necessary that these three colors are exhibited to the eye within one-sixteenth of a second, which means that the scanning disc or drum must make a complete revolution within one-third of the time required for uncolored or black and white pictures, so that the entire picture may be shown three times, each time with a different color, within the time limit of one-sixteenth of a second. Thus the eye will behold a single picture in the three color tones selected within the time period of persistence of vision, and it is on this fact that the present invention is based.

From this brief and general idea of coloring images, it may be seen that the basis in every instance, whatever the variants or methods or means of obtaining colors may be, is to color the light which forms the image with three different colors, each whereof persists throughout one complete revolution of the scanning means or one complete formation of the picture, so that the change in color must occur at one-third the speed of a succession of images. Hence, any moving or rotating device which colors the light must be geared or otherwise connected with the scanning means in such manner that the angular velocity ratio will be as three to one, or some multiple of this relationship.

With the foregoing and other objects in view, the invention consists in the novel and useful formation, construction, interrelation and combination of parts, members and features, as well as mode and methods of use thereof, and steps and performances taken and had, all as hereinafter described, shown in the drawings and finally pointed out in claims.

In the drawings:

Fig. 1 is a partly diagrammatic elevation of a television sending station arranged for colored pictures, with sources of electricity for transmission.

Fig. 2 is a similar picture of a receiving station arranged for colored pictures;

Fig. 3 shows a partly diagrammatic perspective of a television sending station with light-coloring devices;

Fig. 4 is a cathode ray television receiver having means for coloring the images, partly diagrammatic;

Fig. 5 is a partly diagrammatic perspective of an image-receiving apparatus using a scanning drum with three colored lights for giving color to received image;

Fig. 6 is a variant of Fig. 5, the scanning means being changed to oscillograph and rotating mirror means;

Fig. 7 is another diagrammatic form of apparatus having scanning means and colored light means similar to Fig. 6, with a selective color disc;

Fig. 8 is an elevation of the selective color disc shown in Fig. 7;

Figure 10:
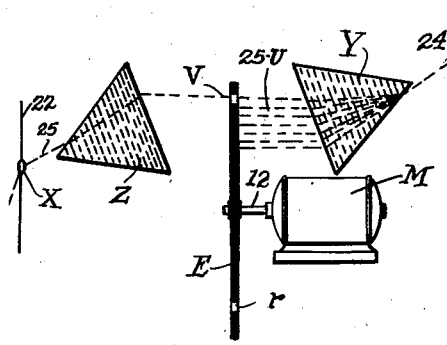
Fig. 10 is similar to Fig. 9 except that a lens in Fig. 9 is replaced by prism.

While this invention relates more specifically to coloring received images, the diagram of a sending station operating with a receiving station is shown in Fig. 1 in order to make clear the general conditions of transmission and reception when natural colors show in the received image.

S—I is a scanning disc having holes H arranged in spiral formation, there being a constantly changing radius for equal angular distances apart of the holes and known in the art as the Nipkow disc.

F—I is a frame or opening which subtends a small portion of the disc S—I, and the image to be transmitted shown at A is, by any preferred optical means, caused to fall within the limit of the frame F—I.

Behind the disc S—I is the photo-electric cell P which changes the electrical energy therethrough with the change in light brilliancy which may fall on it. As disc S—I rotates, small areas of light from the image A successively pass through the holes H and fall on the photo-electric cell P. Since the innermost hole is at the lower edge of the frame and the outermost hole is at the top of the frame, and the number of holes and their diameters are such that their rotary paths are successively tangent to each other, it is obvious that the entire frame F—I will be lighted by the successive positions of the holes H, and the photo-electric cell P will change the electrical current flow therethrough with the brilliancy of the light passing through each hole. Wires 16, 17, connected to source of electrical energy b lead from the sending station, the photo-electric cell P being in series with the circuit.

These electric wires 16 and 17 lead from the photo-electric cell P to the amplifier K where the electricity through the photo-electric cell is increased in intensity, and from K, by wires 18 and 19, the electric current passes into a special type of lamp, such as the Neon or other suitable lamp, and by this received current the lamp T is lighted. Disc A—2, which is identical with disc S—I and turns in exact synchronism therewith, permits a ray of light to pass through it into the frame F—2 whenever the corresponding hole in disc S—I passes over frame F—I. In consequence, small areas or spots of light passing through the holes in S—I fall within the boundary of the frame F—2 and these correspond in intensity with the intensity of the illumination of the image A in Fig. 1. By turning the discs so that they make a complete rotation within the memory of the eye, or one-sixteenth of a second, the shadings of light and dark which make the picture of the image in F—1, appear similarly in frame F—2. This being the general principle of any present television system.

In this invention, however, transparent colored wheel C, mounted in shaft 12, is interposed between the light from the image A and the disc S—1, and the gear J—1 on shaft 10, having one-third the number of teeth of gear J—3 on shaft 12, on which latter the colored disc C is mounted, it is obvious that the colored disc will turn through one-third revolution while scanning disc S—1 makes a complete revolution. Therefore, light from the image, falling on photoelectric cell P is colored to conform with that of one sector of rotating member C, which color persists throughout a complete cycle or revolution of the scanning disc S. This same condition is succeeded by the second and third colors, so that the light which falls upon the photoelectric cell P, not only has a brilliancy which corresponds with the image A, but throughout one revolution has one of the colors which the image A possesses.

The same arrangement is provided at the receiving end device of Fig. 2, so that the light which is modulated by the photo-electric cell P and produced in lamp T, is given one of the three colors of the disc C—2, so that the transmitted image from the receiving station shown at Fig. 1, and the received image at the station shown at Fig. 2, both have identical color values at the same time, as well as similar brilliancy values.

Discs C and C—2 both rotate in one-sixteenth of a second, while the scanning discs S—1 and S—2 turn three times as fast. From the previous explanation, it follows that the image A—2 appears in the boundary of frame F—2 in its natural colors.

Fig. 3 shows a modification for coloring images at the sending station, being an arrangement which is sometimes used for transmission of pictures in plain black and white gradations. As shown, a source of white light T sends rays 24 to lens L, which so concentrates the rays that they fall substantially within the limits of the frame F as they progress from the lens L toward object O. As scanning disc S rotates, the successive holes H pass across the frame F as before described, and with the uncovering of each hole by its movement into the pencils of light 25, a small ray or light pencil 25a will reach object O and be reflected from the object in several possible directions, so that the single ray 25a may send reflected light to light-responsive devices P—1, P—2, P—3, such as photo-electric cells. The optical system and the placing of the scanning disc and frame with respect to the location of the object are such that the entire object to be shown is illuminated by successive light rays which pass through frame F. Obviously, if object O is large and frame F is small, there must be considerable diversion of the rays through holes H in order that they may cover the entire object O by their successive admissions of light from light source T to object O.

The light-responsive devices P—1, P—2, P—3, are connected in parallel and all the branch circuits are joined to main wires 16, 17. A source of electrical energy B is inserted in the circuit as shown, and the two outgoing wires from the light-responsive devices lead to an amplifier as indicated. The use of this system requires that the room or apartment in which the sending apparatus is placed be in complete darkness, the only light being that from the source T, and is definitely controlled by some preferred optical system as lens L, so that the only light which appears is either the dark rays from light source T to object O or the reflected rays from object O to any or all of the several parallel connected light-responsive devices as P—1, P—2, P—3.

In order to have the outgoing electric current which is continually modified by the intensity of the light falling on the electro-responsive devices, suitable for reproducing the image of the object at a distance in color, the rotating color disc or filter C is interposed between lens L and object O. As before explained, the light which falls on the light-responsive devices must have one single color throughout one cycle of operation of the scanning means or one complete rotation of the scanning disc, and in the same manner as has been explained, scanning disc S is arranged to rotate at an angular speed three times as great as that of the rotating color filter C. This filter is divided into three equal sectors, whereof one imparts a red color, the second a green, and the third a blue-violet color, to the light passing to object O. Motor M is direct connected to disc S by shaft 10. Pinion J—1 on shaft 10 gears with pinion J—3 on shaft 12 through an intermediate gear J—2, which in this instance is merely a spacing gear. The number of teeth in gear J—3 being three times as great as the number of teeth in pinion J—1, shaft 12 with rotating color filter C will turn at one-third the angular velocity of scanning disc S, so that one single color will be maintained throughout one complete coverage of object O by light rays from source T. Vertical members 20, 21, are supports for the rotating parts previously described.

It is obvious that color filter C may be located anywhere between lens L and object O, its position and method of mounting being dictated largely by convenience. If a receiving device such as is shown in Fig. 2 be connected with the sending apparatus as indicated in Fig. 3, and color filter C—2 and scanning disc S—2 be in synchronism with color filter C and scanning disc S respectively, the image A—2 appearing in frame F—2 will be shown in the colors successively red, green, blue-violet and blends and mixtures of these colors.

One of the well-known image-receiving devices comprises the adaptation of cathode rays appropriately deflected by a scanning means, so that an image is formed on a ground-glass or similar surface placed at the end of, and forming a cover for, a containing tube in which the various parts of the cathode ray system are contained. In order to show received images in their natural colors, it is only necessary to interpose a color filter between the eye of the observer and the image formed on the picture-receiving surface of the instrument.

In Fig. 4, Q is the container, A the image receiving on an appropriate receptor forming the end cover of Q, C is a rotating color filter divided into three equal sectors which are successively red, green and blue-violet, this filter being mounted on shaft 12 and geared through pinion J—1 and gear J—2 to motor shaft 10 driven by motor M. The speed of the motor is synchronous with the cyclical speed of complete image formation, so that the motor makes one revolution for each production of the image A. The gears between motor and color disc are such that the latter turns through 120 degrees for each complete image formation, and therefore through one revolution within the time period of the complete formation of three successive images, which time period is within the limit of persistence of vision as before explained. This arrangement results in production of received images in their natural colors, it being assumed, of course, that the electrical waves from the sending apparatus are themselves appropriately modulated synchronously with the colors as they appear at the receiving station.

Instead of using a rotating color filter as has been described and shown in the prior figures, the desired colors may be imparted from three separate light sources, which themselves have the desired color, each whereof is lighted during the time period of one complete formation of the image.

In Fig. 5, the scanning device comprises a band or drum having a number of holes, H, perforated therethrough, the locus of which is a helix. This drum is supported by and rotated on shaft 10, which has bearings in members 21 and 22. The image-receiving frame F is in this case a rectangular opening placed substantially tangent to one side of the drum S. The uppermost hole coincides with the upper edge of the frame F, while the lowermost hole coincides with the lower edge of the frame, the intermediate holes being of such number and diameter that a revolution of the drum uncovers the entire area of frame F. Conveniently placed in rear of frame F, with a sector of drum S interposed, are three sources of light, R, G, V, each whereof has a lens L so located as to concentrate the light from its lamp on to the area covered by frame F. A commutating wheel J—2 is geared through pinion J—1 to shaft 10 on which scanning drum S is mounted, the gearing ratio being three to one, as before described. Three contact segments, s, t, x, each subtending 120 degrees of wheel J—2 and placed at different distances from the center thereof, contact with brushes 30a, 31a and 32a respectively, which brushes are connected to wires 30, 31 and 32. Brush 18a contacting with disc K, and to which wire 18 is attached, carries electric current from wire 18 to each of the segments s, t and x through contact disc k and the connecting members from k to J—2, as shown. The opposite side of the circuit, composed of wire 19, is connected to each of the lamps R, G, V, there being a source of electrical energy b inserted in line 19. Assuming that the circuit from 19 to 18 be closed, it is obvious that rotation of shaft 11 and commutating wheel J—2 will successively pass electric current to each of the lamps R, G, V, and each will be maintained illuminated throughout 120 degrees of rotation of wheel J—2 corresponding with a complete revolution of scanning drum S. Since each of the lamps has a different color, namely, red, green and blue-violet, and the light from each is caused to fall on receiving frame F, it is obvious that the image received in frame F will have one color for each revolution of the scanning drum S and the three successive colors will be imparted to each complete successive image, thereby producing the image in its natural colors, as before explained. It is clear that this arrangement is similar to the previously described color-imparting means comprising as it does a scanning means and three different light colors, the rays whereof pass through the scanning means to the image-receiving frame, and each color being maintained throughout one complete cycle of image-formation. Also, it is equally applicable to any scanning means, as a scanning disc. The colors of the lights may proceed from any preferred cause or arrangement. They may be inherent in the type of lamp used; they may be imparted by the color of the globe in which the lamp parts are contained; or they may be colored by interposed light filters, or any preferred means; the general arrangement being simply that of three successive lights having different colors when they reach the scanning means.

Another modification is that in which the same arrangement of having three colored lights successively commutated but applied to a different scanning means is that shown in Fig. 6. The lamps R, G, V, correspond to the lamps similarly lettered in Fig. 5, and the light from each, instead of being carried direct through some optical system to the receiving frame F, falls on prism Y. The location of the lamps, their distance of separation, the position of the prism Y and its index of refraction, are all so correlated that the light from any lamp passing through the prism and after such deflection as is produced thereby, reaches the opposite face of the prism at the substantially same point; so that the continuation of rays from any one of the three lamps from the prism and on past it, will all follow an identical path. As shown, ray v from lamp V strikes prism Y, is refracted through it, emerges and follows path 25a, and this same condition is true of ray r proceeding from lamp R, which strikes the prism at a point spaced from the point at which ray v strikes prism Y, but ray r after passing through prism follows the same path, namely, 25a. This path terminates in a tiny mirror X mounted on suspension 22, which two elements form part of an oscillograph. The light ray 25a is reflected to one of the reflecting surfaces 40 of mirror drum D, following the path 29a from mirror X to that segment of the drum against which it impinges, and from that reflecting segment follows the path 29c to a corner of the frame F. Assuming that drum D is momentarily at rest, oscillation of mirror X will cause the ray 25a to be reflected along line 29b, that is, it will travel along the reflecting segment of the drum and axially thereof to follow the path 29d to the opposite corner of frame F at the same elevation. However, if it be assumed that mirror X does not oscillate, but drum D continues rotating, the ray 29a will be moved with drum rotation from the position at an upper corner of frame F to the corner just below it following the path 29e. Since both oscillation of mirror X and rotation of drum D are occurring simultaneously, it is obvious that the ray of light 25a is moved across the frame F by mirror X and down from top to bottom of the frame by rotation of drum D. Obviously, such a scanning system requires a particular kind of sending system with which it can synchronize. If it be assumed that a commutator disc such as J—2 shown in Fig. 5, with its brushes and lamp connections, are used to successively light the lamps R, G, V, shown in Fig. 6, then the light falling upon frame F will have the successive colors and if the angular velocity of commutator wheel J—2 be appropriately related to the movements of oscilloscope mirror X and reflecting mirror drum D so that one complete image is formed in frame F for each time period during which one of the colored lamps remains lighted, then the same results as before described are achieved and the picture will appear in its natural colors.

Fig. 7 is a modification of the arrangement shown and described in Fig. 6. The three lamps R, G and V are arranged with any preferred optical system, such as the lenses shown in the figure, to cast light rays toward prism Y, the relationship between the positions of the different parts and the refractive power of the prism all being such that the ray from any lamp after passing through prism Y follows path 25a as indicated by the dotted line, and falls upon mirror X suspended on oscillatory member 22, the drum D and frame F being similar to the showing in Fig. 6.

In this arrangement, however, instead of commutating the lamps R, G, V, a rotating slotted disc is interposed between them and prism Y as shown. This disc, as more clearly depicted in Fig. 8, has three slots, each of which is the arc of a circle about the centre of rotation of the disc, the radius of the three slots differing by an amount equal to the distance apart of rays from the lamps R, G, V, as they converge at that vertical plane in which slotted disc E rotates. Each arcuate slot subtends an angle of 120 degrees, so that one revolution of the disc E will successively permit passage of light from each of the three lamps R, G, V, to prism Y, the time period of which passage will be one-third the time of one complete revolution of disc E. Obviously, the same results as before described and indicated will be obtained from this arrangement, the main difference being that the lamps burn continuously, the light from any two lamps being always obscured by the opaque disc E, while the light of one lamp passes through one of the slots therein and reaches prism Y to follow its paths over to frame F. Motor M, with gear J—1 meshing with gear J—2 on shaft 11, on which shaft opaque disc E is mounted, runs at such a speed that the geared disc turns through one-third revolution for one complete cycle of the scanning means. As in the previously described cases, the brilliancy of the lamps is modulated at the sending or transmission station to conform with the image which is being transmitted, while the color of the light from each of the lamps may be produced by or proceed from any preferred arrangement, whether by the inherent character of the luminous substance within the globes or by the color of the globes themselves or the interposition of fixed color filters, or any other means for coloring light.

Figure 9:
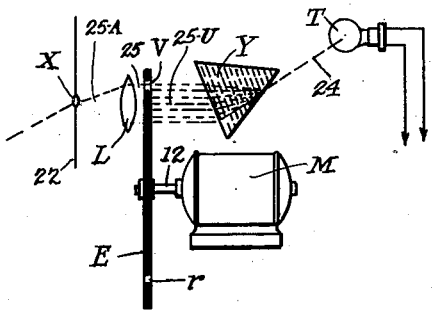
Fig. 9 is a diagrammatic indication of means for coloring images, having a scanning system and selective color disc similar to Fig. 7, with prismatic means for obtaining desired colors.

Fig. 9 is a variant of Figs. 7 and 8 before described, and only the parts are shown which differ from those of the previously described figures. In this arrangement a single lamp T which emits white light is continuously illuminated, and certain rays therefrom shown by dotted line 24 reach prism Y. This white light is dispersed into the colors of the spectrum as indicated by the light rays 25U. The position of the prism is such that the prismatic rays 25U are emitted in a direction approximately perpendicular to the plane of opaque disc E, which latter is driven by motor 12, as shown. Disc E is similar to the disc shown in Fig. 8 and previously described, the arcuate slots therein being so positioned that all of the prismatic colors of the spectrum 25U are intercepted with the exception of one desired color. The three arcuate slots in disc E are so positioned that the red, green and blue-violet strips of the light spectrum 25U successively pass through the disc by these openings, and thence to mirror X mounted on suspension fiber 22 forming part of an oscillograph, which latter is adapted to cooperate with a rotating mirror drum as shown in Figs. 6 and 7. Since the colored lights which pass through the slots in disc E emerge in different positions, they must be turned toward mirror X by some preferred optical system, as by lens L, which is adjusted to receive each of the three different groups of colored rays and transmit them successively to mirror X, as indicated by dotted line 25, which shows a pencil of violet light passing through a slot in disc E to lens L and being turned by lens L by path 25A to oscillatory mirror X.

The receiving system partially shown in Fig. 10 is identical with that shown in Fig. 9, with the exception of the optical system used for directing the light rays from slits in rotating disc E to oscillatory mirror X, a prism Z being used in this case instead of lens L, as shown in Fig. 9. It is, of course, understood that any of these arrangements for obtaining different colored lights by prismatic separation of white light may be applied to any scanning system, those shown in Figs. 6 to 10 being merely indicative.

Figure 11:
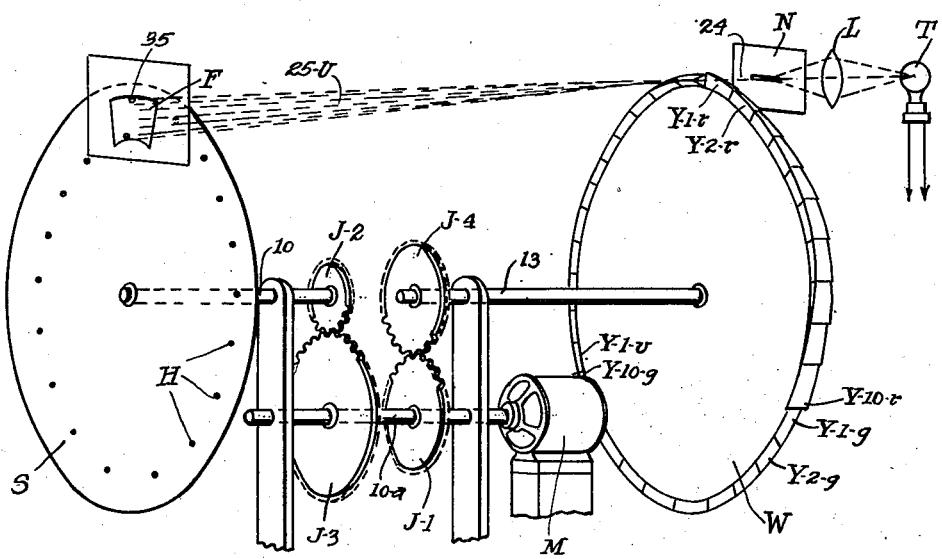
Fig. 11 is a diagrammatic perspective indicating an image-receiving and coloring apparatus, the latter comprising rotating prisms.

Fig. 11 is a variant of the methods for obtaining desired colors from white light by prismatic separation and projecting the desired color through a scanning means S on to a frame F by shifting the angular position of a series of prisms, as indicated. T is a lamp which emits white light. N is a narrow slot through which a beam 24 of white light passes, this beam being concentrated if desired by any optical means as by a lens L. W is a disc, the outer periphery of which is surrounded by a succession of prisms, or by three continuous twisted prisms, the effect being the same in either case, as will appear. The lamp T, as in other cases described, is modulated by the usual and previously described means at the sending station to accord with the image to be transmitted. Motor M drives both scanning disc S and prism disc W by gears on the motor shaft 10a meshing with a gear J—2 on the shaft 10 of the scanning means S and a gear J—4 on shaft 13 of the prism disc W. As in the case of all of the systems herein included, the scanning means must make one complete revolution or produce one complete image during the time which one color of light continues, and in this receiving system the gearing is such that scanning disc S makes three revolutions while prism disc W turns through one revolution.

Figure 12:
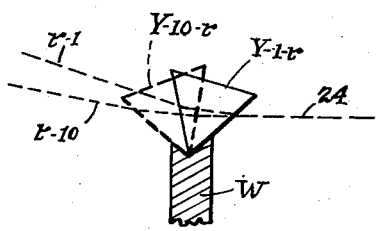
Fig. 12 is a detail of Fig. 11 enlarged.

By referring to details shown in Fig. 12, the operation of the rotating prisms is made clearer. Beam of white light 24 reaches prism Y—1—r and is separated into its prismatic colors, of which one color is red, indicated by the light ray r—1 emerging from the prism Y—1—r. The direction of the light ray r—1 is obviously due to the angles which the sides of the prism make with the light rays. Manifestly, if prism Y—1—r be tilted toward the left to occupy the position Y—10—r, then the red end of the spectrum would follow the path r—10 as indicated, although the ray of white light 24 would follow the same identical path as in the first instance. The periphery of the prism wheel W is covered with a succession of short prisms, each whereof makes a different angle with the surface of the disc. If the ray of red light from the first prism Y—1—r travels along a path such that it reaches the top of frame F and the last prism of the group Y—10—r is turned at such an angle that the ray of light r—10 terminates at the bottom of the frame F, the intermediate positions gradually shifting the spectrum downward so that the red rays continue to follow the holes through the scanning disc S throughout one revolution, the red color will thereby persist throughout the formation of one image in frame F. If there be three groups of prisms attached around the periphery of prism disc W, the successive portions of any one group being so tilted that the first element of the group in rotating will project one of the desired colors from the entire spectrum at the top of the frame F while the last prism of that group will project the same color on the lower element of the frame and there be three such groups, then three colors obtained by the dispersion of white light through a prism will successively follow from top to bottom of the frame. If the before-described ratio of three complete images formed in the frame for each of the successive colors be maintained, the image will be received in its natural colors, provided, of course, that the sending means have been appropriately modulated and colored as before described.

Figure 13:
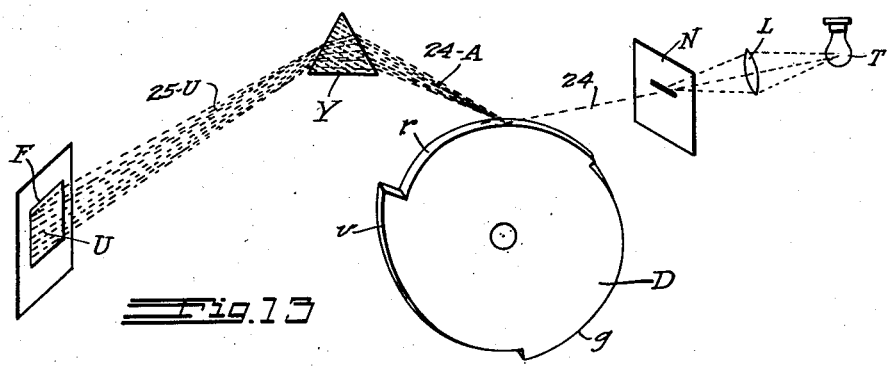
Fig. 13 is a diagrammatic perspective of a means for providing color for received images by use of a variable angle for reflecting white light passing through a prism.

Fig. 13 is another application of the separation of white light into its constituent colors by passing it through a prism, selecting the three desired colors from the spectrum and holding each of these three desired colors on the frame throughout the period of formation of one image. As before, T is a source of modulated white light, L is a lens or other optical means for concentrating the light on slit N in a thin opaque sheet so that light ray 24 will pass to a rotating reflecting surface formed on periphery of drum D. The ray of white light 24 is reflected from the drum surface to prism Y and passing through this prism is broken into its constituent colors which vari-colored light rays 25U terminate in a spectrum U at frame F, the scanning means not being shown. Rotation of drum D, having reflecting surfaces along its periphery of continually changing radius, changes the angle at which white light 24 is received on the reflecting surface, and, therefore, the angle at which it leaves the reflecting surface; so that with a single ray or a flat band of rays 24 falling on a changing reflecting surface, a flat band of light 24a will fall on prism Y in different positions, which in turn causes the prismatic colored rays 25U to emerge from prism Y at different points along the side of the exit and thereby changes the position of the spectrum U upward or downward by appropriate relation of parts and division of periphery of drum D into arcuate paths, each of which is a spiral. Any desired color from the spectrum may be caused to fall at the upper edge of the frame and gradually travel downward to the lower edge or vice versa. Since the reflecting periphery of drum D is divided into three parts, each whereof subtends 120 degrees, three different colors may be selected, and each made to travel over frame F. While all the colors of the spectrum will be present and at times will lie within frame F, the scanning means as shown in Fig. 11 will prevent any rays from passing through to frame F, except the desired colors for the production of which the parts of the receiving system are mutually formed and adjusted.

Figure 14:
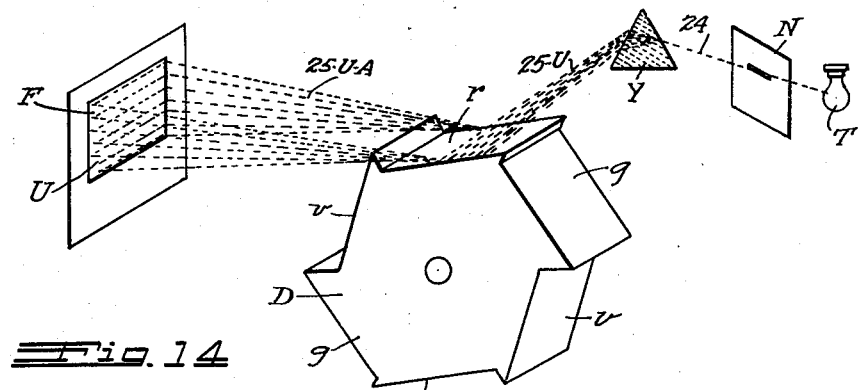
Fig. 14 is a variant of Fig. 13 in which white light passing through a prism casts a spectrum on a variable angle reflecting means.

Fig. 14 shows an arrangement for reception of colored images which is substantially the same as that shown in Fig. 13 and just described. T is a source of white light while N is a narrow slot in a thin member; Y a prism; D a drum having reflecting surfaces around its periphery, and F the frame; no scanning means being shown. In this receiver the white light is separated into its constituent colors by prism Y before reflecting the light on to frame F as shown.

The surfaces which form the peripheral boundary of rotating member D are six in number, so that for equal speed of scanning discs, drum D in this arrangement would run only at half the angular velocity of drum D shown in Fig. 13 and having three reflecting surfaces. As before, 25U is the white light dispersed by prism Y, falling on reflecting surface r of drum D, and being reflected along paths indicated by 25UA, the entire spectrum U being shown on frame F. It is understood, of course, that the scanning means will intercept all light except that having the desired color for each position and period of formation of the image in frame F.

Figure 15:
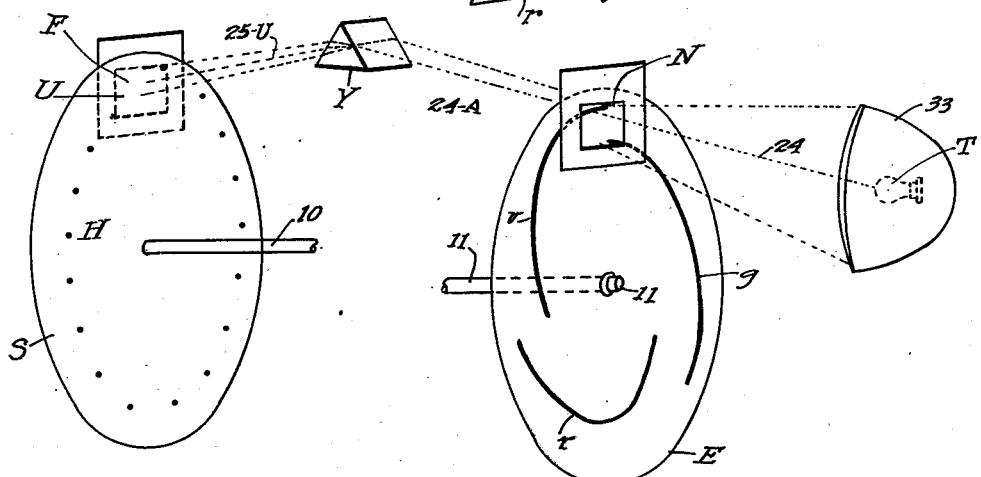
Fig. 15 is a diagrammatic fragmentary perspective of some of the parts for supplying color to a received image from a source of white light falling upon a prism, there being a slotted disc interposed between light and prisms.
Figure 16:
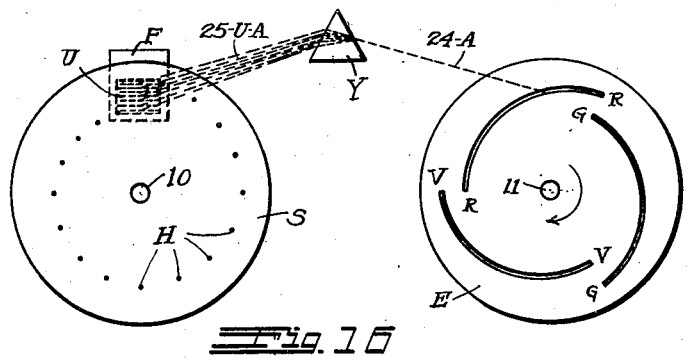
Fig. 16 is a detail of Fig. 15 showing the scanning disc and the selective slotted disc in elevation.

Fig. 15 shows another adaptation of the prism for securing desired colors of light from a source of white light appropriately modulated by the sending system. T, shown in dotted lines, is the modulated white light having a reflector 33 around it. This reflector concentrates the rays of white light, one of which is indicated by dotted line 24, so that they fall substantially within the rectangular opening N placed in front of an opaque slotted disc E mounted on shaft 11 and adapted to rotate. The white light continues through opening N and one of the slots v along the path 24a to prism Y where it is dispersed into a plurality of colored rays 25U, which rays fall on scanning disc S and frame F. A detail of this arrangement is shown in Fig. 16, whereby the arrangement and operation are more clearly depicted. As shown, the slots through opaque disc E are arcuate in form and each subtends 120 degrees, but each slot has a constantly changing radius, and, therefore, is part of a spiral. Since light from the source T can reach prism Y only through a slot having a variable radius, it is obvious that the light rays passing through any slot will travel inward toward the centre of the disc until the next slot is reached, when they will pass through an opening at a greater radius and again travel inward, thus shifting the position at which the rays of white light will impinge on the receiving surface of the prism Y. After the white light 24A passes through prism Y, it emerges as vari-colored prismatic light 25UA falling as a complete prism on the scanning disc S. The only path which the prismatic colored light may take to reach the frame F is, therefore, through one of the holes H in scanning disc S. By so proportioning and positioning the parts, that only the red, green or blue-violet strips of the prism coincide with the holes through the scanning disc at any instant, and that each of these colors will travel from top to bottom of the frame F, through the spiral arrangement of holes H in disc S by appropriate radii of arcuate slits R, G, V in disc E, the three desired colors may each be made to travel successively from top to bottom of frame F, thereby producing colored images as has been before described.

Figure 17:
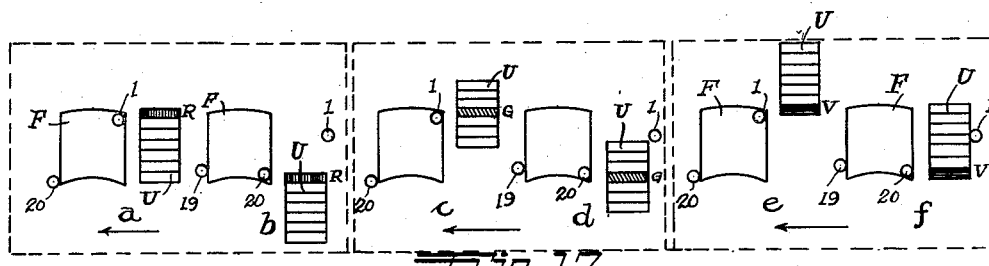
Fig. 17 shows a series of diagrams which indicate the relation of the light spectrum to the holes through the scanning disc or drum for different conditions depicted in previous figures.

In Fig. 17, different positions of the scanning disc holes, the frame opening and the spectrum are shown in order to make this arrangement clear. In the separate portions of the figure, namely, a, b, c, d, e, f, the frame opening is indicated by F, while U represents a complete spectrum as obtained by dispersion of white light by passing it through a prism or grating. The small numbered circles indicate holes through a scanning means, such as a disc or drum, and for purposes of illustration it is assumed that the total number of holes is 20, hole 1 being in such position that it moves along the upper edge of frame opening F while hole 20 is in such position that it moves along the lowermost edge of frame opening F. The size of the holes is greatly exaggerated for clearness. In position a, the formation of an image in the frame is just beginning, hole 1 having entered the opening F, hole 20 having just passed out from the frame opening. At that instant, the entire spectrum U is at such an elevation that the uppermost or red band falls on the upper portion of the opening F and the red light from the red band R passes through hole 1 of the scanning means and falls within the area of the frame opening F. As the scanning means continues to move, successive holes, having positions which approach nearer and nearer to the lowermost boundary of frame opening F, pass over this area. In order to maintain red color through each succeeding hole, the entire spectrum U must move downward. Fig. 17b shows the final position of the spectrum when the last or twentieth hole in the scanning means begins to cross the frame opening F. As is seen, the uppermost band of the spectrum U which is red is at such an elevation that it falls on the lowermost element of the opening F, and, therefore, passes through the last hole 20 of the scanning means. In traveling from position a to position b, the entire spectrum U has progressively moved downward, and although the seven colors of the spectrum fall on or over the area of frame opening F, all the colors are intercepted by the scanning means except the one color having the same height or corresponding in position with one of the holes in the scanning means.

Figs. 17a and 17b show the positions of the initial and final spectra, the movement from top to bottom having been caused by any of the previously described means, whether by change in the direction of the path of the rays of white light and the location of their impingement on the entry surface of the prism, or whether by changing the direction of the dispersed rays, both methods being shown in the prior figures and descriptions.

Figs. 17c and 17d show the initial and final positions of the spectra when the light passing through the holes in the scanning means is to have a green color and is, therefore, taken from a color band somewhere near the middle of the spectrum, Fig. 17c showing the green band at an elevation suitable for green light to pass through hole 1, while Fig. 17d shows the position of the spectrum for the green light to pass through the last or twentieth hole.

Similarly, Figs. 17e and 17f show the initial and final positions of the spectra for supplying the blue-violet light to the frame opening through the scanning holes, Fig. 17e showing the spectrum at an elevation such that the lowermost color band is positioned to pass its color through hole 1, while Fig. 17f shows spectrum moved downward until the lowermost color band registers with the last or twentieth hole of the scanning means. From these diagrams indicating relative positions of frame opening, scanning holes and spectra, it is clear that any color from the spectrum may be selected to be maintained throughout one cycle or revolution of the scanning means.

Figures 18, 19:
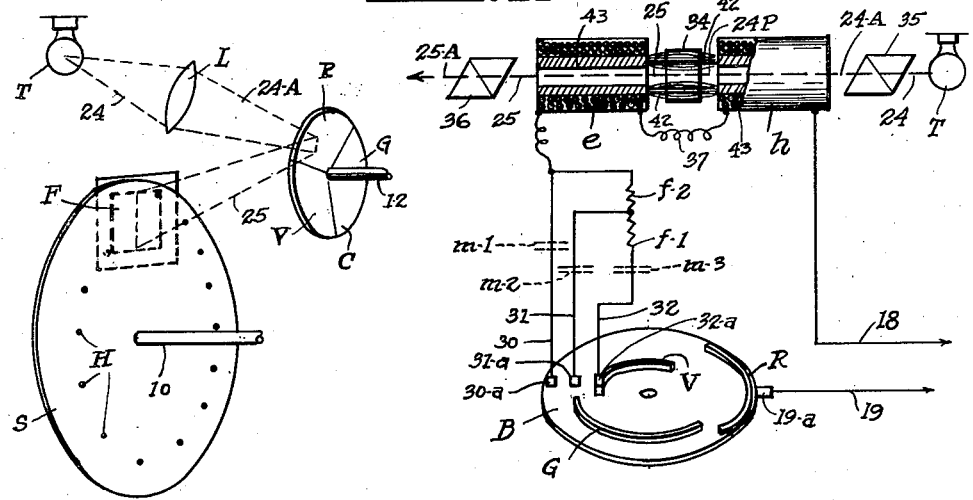
Fig. 18 shows a fragmentary diagrammatic perspective of a reflecting means of coloring images.
Fig. 19 is a diagrammatic indication partly in section, partly in perspective, of means for light-polarization and electro-magnetic means for obtaining colors for received images.

Fig. 18 is a modification of the color filter method of imparting color to the light passing through the holes in the scanning means throughout one revolution thereof or the complete formation of one image. S is a scanning disc having holes H and mounted on shaft 10 about which it rotates; C is a reflecting color wheel divided into three equal segments, R, G, and V, and mounted on shaft 12 about which it rotates, the color wheel C being geared to turn at one-third the speed of the scanning disc S; T is a source of white light, while L represents a lens or other optical means for concentrating the white light on the surface of the color disc C. The positions of the parts and their dimensions are such that the light received by the image-frame F is reflected from the color disc C and reaches frame F through holes H in scanning disc S, as has been previously described. The light T is modulated by the transmission or sending apparatus to correspond with the image to be transmitted, and this modulated light finally reaches frame F only as a colored light by reason of this reflection from one of the three colored segments, red, green or blue-violet of color disc C. This arrangement provides the necessary conditions before recited for producing received images in natural colors.

Fig. 19 is a variant of means for obtaining the desired colors at appropriate apparatus in the formation of a received image, no scanning means being indicated. T is a source of white light modulated by the sending apparatus, sending the ray of white light 24 to a polarizing means 35. The light rays 24A are polarized by means 35 and this polarized light is passed through a solenoid winding h having a tubular iron core 43, the central hole being made in the core to permit passage of light axially therethrough. Co-axial with solenoid h is solenoid e, likewise having a tubular iron core 43, the inner ends of the solenoids e and h being separated to permit mounting a piece of flint-glass 34 having the desired thickness, and its periphery being circular, rectangular or any other convenient form. When electric current is passed through solenoids e and h, a magnetic field, indicated by fine lines 42, is set up across the gap between their neighboring ends, which lines of force pass through the flint-glass 34. This transparent material and certain others have the property of rotating the plane of polarized light under the influence or stress of a magnetic field. The polarized light beam 24A has had its plane rotated to a certain degree, depending on the intensity of the magnetic field when it has reached position marked 25, having passed through the transparent substance 34. This ray of light 25 passes on leftward to an analyzer 36, and emerges at 25A as a colored light, the color depending on the strength of the magnetic field for certain fixed conditions. The colored light 25A proceeds to any preferred scanning means and image-frame such as have been before depicted and described, or any other convenient arrangement of the same general character. B is a rotating disc having contact segments mounted thereon, R, G, V. Brushes 30a, 31a and 32a contact respectively with segments R, G, V; also wires 30, 31 and 32 connect with the brushes having these same numbers. Wire 32 passes through a resistance f1 plus f2, enters solenoid winding e through which it passes, and thence by wire 37 through solenoid h, finally passing out at main wire 18. Wire 19, is connected to brush 19a, which contacts with disc B and thereby transmits current from wire 19 to wire 32. This completes the circuit, assuming that the portions of the system not shown to which wires 18 and 19 connect, form a path between these two wires. Wire 31, which is connected with wire 19 through previously described means, passes to solenoid winding e through resistance f2, while wire 30, likewise connected to wire 19, passes to the solenoid windings without any resistance in circuit, all as indicated in the diagram. The segments R, G, V on rotating disc B are arcs of circles drawn about the centre of the disc, each whereof subtends 120 degrees so that through one-third revolution of the disc, current passes through the solenoid windings e and h with the maximum resistance in series therewith, and for one-third of a revolution of the commutating disc B, current passes through the solenoid windings with only the resistance f2 in series, while during one one-third of the revolution, current passes directly through solenoid windings e and h without any resistance in circuit. Obviously, the strength of the magnetic field 42 will be least when wire 32 with the maximum resistance conveys current to the windings and will be greater for current flow over wire 31 and the diminished resistance f2 and greatest for current flow via wire 30 with still less, or possibly zero, resistance in circuit. Since the colors obtained, after the light has passed from source T through the various parts and members and exits from analyzer 36 at 25A, depend on the strength of the magnetic field, it is obvious that three different colors will appear with one revolution of disc B, and by this means the desired colors may be obtained and maintained throughout the rotation or complete cyclical movement of a scanning means if the angular velocity of disc B is properly adjusted to make one-third of a revolution for each complete formation of an image.

Figure 20:
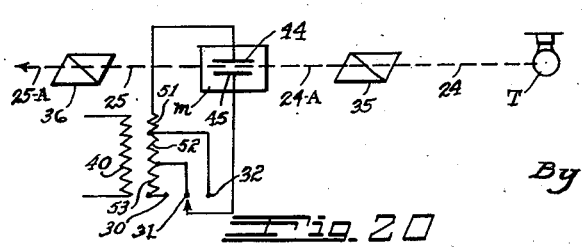
Fig. 20 is a diagrammatic indication of light-polarization and electro-static means for obtaining colors from white light for received images.

Fig. 20 indicates a method of obtaining desired colors from polarized light by means of electro-static stress, being in other respects similar to the previously described method depicted in Fig. 19. T is a source of white light modulated by the sending apparatus; 35 is a polarizer receiving light ray 24 which emerges from polarizer 35 as a polarized light ray 24A. m is a condenser having a dielectric which has certain specific properties, viz: it must be transparent and become doubly refracting under "charge" or electrostatic stress. The ray 24A of polarized light passes through the dielectric and between electrodes 44, 45, and emerges as ray 25 to pass on to an analyzer 36 from which it emerges as a colored ray 25A, which is directed to a scanning device, the color depending on the electrostatic stress, or on the voltage, across plates 44 and 45. Change in color, therefore, requires change in the voltage impressed on the electrodes 44, 45. This voltage change may be effected in a number of ways, one way being shown in Figs. 19 and 20. The incoming source of electrical supply is connected to the primary, 40, of a transformer or induction coil, the secondary whereof has a plurality of taps, as shown at 30, 31 and 32. One end of the secondary winding is connected with plate 44, while plate 45 has a wire adapted to be connected with any of the said taps, as by the commutating disc B with its contact segments depicted in Fig. 19. When plate 45 is connected to tap 32, the voltage between the plates is that produced by that portion of the secondary 51; if the plate 45 be connected with tap 31, the voltage across the plates will be that produced by 51 plus 52, while if the commutating disc connects plate 45 to tap 30, the entire secondary voltage is impressed on the condenser. By use of any appropriate switching means, whereby the connections are shifted from tap to tap with each complete cycle of a scanning device and suitable voltages for each tap from the secondary, the colors of the light directed to the scanning device will be changed with each cycle of complete image formation. As in other colored light devices shown, the rays 25A emerging from the analyzer may be directed by position or any convenient optical means to the scanning device.

Having described my invention in connection with illustrative embodiments, forms, proportions and arrangements of parts, it will be understood that many variants thereof are possible to those skilled in the art, and my invention, in its broader aspects, is not limited to the specific construction herein described and shown, as changes in the sizes, proportions, configurations, arrangements, assemblage, interaction, juxtaposition and mechanical relations, as well as additions, omissions, substitutions, combinations and alterations of forms, parts, members and features, may be made without departing from the broad spirit of this invention.

Having thus disclosed my invention, I claim and desire to secure by Letters Patent:

1. In television reception, wherein images are formed by modulated light and a scanning means, the method of coloring the images, including passage of the modulated light through a light-dispersing means; projecting one of the color bands of the spectrum thus produced on to the scanning means, and moving the spectrum continuously and in accordance with the changes in position of the light-directing member of said scanning means.

2. In television reception having a scanning means the method of coloring the images, including the passage of modulated light through a light-dispersing means; projecting one of the color bands of the spectrum thus produced on to the scanning means and moving the spectrum continuously and in accordance with the changes in position of the light-receiving member of said scanning means to maintain said selected color throughout one complete production of the image.

3. In television reception having a scanning means, the method of coloring the images, including the passage of modulated light through a light-dispersing means; projecting one of the color bands of the spectrum thus produced on to the scanning means and moving the spectrum continuously and in accordance with the changes in position of the light-receiving member of said scanning means to maintain said selected color throughout one complete production of the image, repeating this image-formation with two additional bands of the spectrum and maintaining each of the three said colors throughout the formation of a single image by said continuous movement of the spectrum, the said three differently colored images being formed within a time period such that the said colors blend upon the retina.

4. In a television device, the combination of a polychrome light source, means controlled at the sending station for modulating said light source, a viewing area, an opaque scanning member having perforations each whereof is positioned to traverse one of a plurality of image-forming lines across said viewing area, a light-dispersing member adapted to receive light from said source for formation of a spectrum, means for directing said spectrum on to the scanning member, means for continuously shifting said spectrum at such rate as to cause a predetermined color band therefrom to fall successively on differently positioned perforations of the scanning member as said perforations traverse image-forming lines across the viewing area during one cycle of said scanning member, and means whereby a different color band from said spectrum falls successively on said differently positioned perforations during each succeeding cycle of the scanning member so that the image is successively formed with different colors of modulated light.

5. In a television device, a source of white light, an image-viewing area, a scanning member having light-directing sections each positioned to scan a separate line across said viewing area, an annular series of variably angled prisms adapted to revolve, means for directing a beam from said light source to a zone of said prisms the angle of refraction of the incident and emerging rays being changed by revolving said prismatic annulus, means connected with the scanning member for revolving said prism, the parts being so disposed that a predetermined color band of said spectrum falls successively upon said light-directing sections of said scanning means, said connection between the scanning means and the revolving prism transmitting a single color band of said spectrum continuously on said scanning means throughout one complete formation of the image, each successive scanning cycle being made with a different color and band of the said spectrum.

6. In color television, the combination of a viewing area having light-directing sections each positioned to scan a separate line across said viewing area; a scanning device; a source of polychromatic light; a prism for dispersion of said light into a spectrum to fall on said scanning device; a rotating opaque member interposed between said light and said prism, said member having light-transmitting sections formed to cause continuous movement of the direction of the light rays entering the prism, causing a corresponding continuous change in the position of the said spectrum on said scanning means, so that a predetermined color band of said spectrum is caused to register with the respectively different positions of said successive light-directing sections; said rotating member being so connected with said scanning device that a predetermined band of said spectrum is directed on the light-directing sections of said scanning means through one complete formation of an image, and for each succeeding cycle of said scanning means light from a different band of said spectrum is directed thereto.

7. In a television device, the combination of a plychromatic light source, a viewing area, a scanning member having a series of light-directing sections, a light-dispersing member, a multi-faced reflecting member adapted to be moved continuously, means for directing a light beam to said reflecting member and thence to said light-dispersing member, producing a spectrum of said light, each face of said reflecting member being shaped to continuously change its angular relation to the light beam consequent on continuous movement of said member and causing corresponding continuous changes in the position of the reflected light beam on the dispersing member and of the position of the spectrum, the parts being mutually so coordinated that said spectrum from the reflecting member will fall upon the scanning means and continuously change its position thereupon in accordance with the positions of successive light-directing sections in said series so that a predetermined color band of said spectrum is maintained upon said light-directing sections as they scan the viewing area during a complete single scanning of said area.

8. In a television device, the combination of a source of polychromatic light, a scanning area, a light dispersing member receiving light from said source and producing a spectrum thereof, a scanning means having light-directing sections each whereof is positioned to traverse one of a plurality of strips across said scanning area, a multi-faced reflecting member adapted to be continuously moved, and to receive said spectrum and reflect same to said scanning means, each face of said reflecting member being shaped to change the angle of reflection therefrom when moved, and correspondingly change the position of the spectrum on said scanning means, the rate of change in the direction of reflection being so related to the speed of the scanning means that the spectrum moves continuously and a single predetermined color band thereof falls successively on differently positioned light-directing sections of said scanning means throughout one complete scanning.

9. In a television device the combination of a polychromatic light source; a viewing area; a scanning member having light-directing sections each whereof is positioned to traverse one of a plurality of strips across said viewing area; a refracting medium adapted to receive light from said source and disperse same into its spectrum to fall on said scanning means; an opaque screen adapted to be moved and having light transmitting sections each whereof is formed to continuously change the direction of light passing therethrough with movement, said screen being interposed between said light source and the refracting means, and means for moving said scanning member and said screen at predetermined relative speeds so that the spectrum moves continuously, thereby causing a predetermined color band to fall successively upon differently positioned light-directing sections throughout one complete scanning.

10. In a television device, the combination of a viewing area; a scanning member having light-directing sections each whereof is positioned to traverse one of a plurality of strips across said viewing area; a beam of polychromatic light; a refracting medium adapted to receive said light and form a spectrum thereof to fall on said scanning means; an apertured opaque screen adapted to move and interposed between said light beam and the refracting medium, said aperture being formed to continuously change the direction of light passing therethrough when the screen is moved, correspondingly continuously changing the position of the spectrum on the scanning member so that a predetermined color-band thereof will fall successively upon differently positioned light-directing sections throughout one complete scanning.

11. In natural color television employing scanning means having a light-directing portion, and an area to be scanned, the method of scanning the said area successively with different colored rays, including the passage of polychromatic light through a light-dispersing means; projecting one of the color bands of the spectrum thus produced on to the scanning means, moving the entire spectrum in accordance with changes in position of the light-directing portion of said scanning means to shift said selected color band and similarly position a succeeding band after each complete scanning.

12. In natural color television employing scanning means having light-directing portions, and an area to be scanned, the method of scanning with colored light rays including the dispersion of polychromatic light, moving the spectrum thus produced continuously to successively position selected color bands of said spectrum for individual projection on to the scanning means, maintaining a selected color band in position throughout one complete scanning, then moving the spectrum to bring successive color bands into said projecting position, and repeating this scanning with each selected color band by said continuous movement of the spectrum, the said scannings in the selected colors all being completed during the time period of the persistence of vision.

13. In natural color television employing scanning means having light-directing portions and an area to be scanned, the method of scanning with colored light rays including the dispersion of polychromatic light, moving the spectrum thus produced continuously to successively position selected color bands of said spectrum for individual projection on to the scanning means, maintaining a selected color band in position throughout one complete scanning, then moving the spectrum to bring successive color bands into said projecting position, and repeating this scanning with three color bands of said spectrum, namely, red, green and blue-violet, by said continuous movement of the spectrum, the said scannings in the said three colors being completed during the time period of the persistence of vision.

14. In television reception wherein images are formed in successive lines in a picture-reproducing area, the method of coloring the images, including passage of light through a light-dispersing means; projecting the spectrum thus produced into the picture-reproducing area, and moving the spectrum continuously and in accordance with the position of successive picture-forming lines.

15. In a television device, a source of white light, an image reproducing area, means for dispersing said light into its spectrum, a multi-faced reflecting drum adapted to be continuously rotated and to receive said spectrum and to reflect same to said image-reproducing area, each face of said reflecting drum being shaped to continuously change the angle of reflection therefrom when moved and correspondingly continuously change the position of the spectrum in said image-reproducing area, so that a predetermined color band of said spectrum will fall successively upon different lines in the image.

16. In a television device, a source of white light, an image-reproducing area, means for dispersing said light into its spectrum and causing same to fall in said image reproducing area, means for continuously shifting the direction of light rays entering said dispersing means, and thereby causing a corresponding continuous change in the position of the spectrum in said image-reproducing area so that a predetermined color band of said spectrum will fall successively upon different lines in the image.

17. In a television device, a source of white light, an image-viewing area, a scanning member having light-directing sections each positioned to scan a separate line across said viewing area, an annular series of variably angled prisms adapted to revolve, means for directing a beam from said light source to a zone of said prisms the angle of refraction of the incident and emerging rays being changed by revolving said prismatic annulus to shift the spectrum formed by said emerging rays, means associated with the scanning member for revolving said prism, the parts being so disposed that a predetermined color band of said spectrum falls successively upon said light-directing sections of said scanning means.

18. In a television device, a source of polychromatic light, an image-viewing area, a scanning member having light-directing sections each positioned to scan a separate line across said viewing area, an annular series of variably angled prisms adapted to revolve, means for directing a beam from said light source to a zone of said prisms the angle of refraction of the incident and emerging rays being changed by revolving said prismatic annulus to shift the spectrum formed by said emerging rays, means associated with the scanning member for revolving said prism, the parts being so disposed that a predetermined color band of said spectrum falls successively upon said light-directing sections of said scanning means, the scanning means and the prismatic annulus having such speed ratios that a single color band of said spectrum falls continuously on the light-directing sections of said scanning means throughout one complete formation of the image, each successive scanning cycle being made with a different color band of said spectrum.

19. In natural color television employing scanning means having light-directing portions, and an area to be scanned, the method of scanning with colored light rays including the dispersion of polychromatic light, moving the spectrum thus produced continuously to successively position selected color bands of said spectrum for individual projection on to the light-directing portions of the scanning means, maintaining a selected color band in position throughout one complete scanning, then moving the spectrum to bring other color bands into said projecting position, and repeating this scanning with each selected color band by said continuous movement of the spectrum, the said scannings in the selected colors all being completed during the time period of the persistence of vision.

20. In natural color television employing scanning means having light-directing portions and an area to be scanned, the method of scanning with colored light rays including the dispersion of polychromatic light, moving the spectrum thus produced continuously to successively position selected color bands of said spectrum for individual projection on to the light-directing portions of the scanning means, maintaining a selected color band in position throughout one complete scanning, then moving the spectrum to bring a different color band into said projecting position, and repeating this scanning with three color bands of said spectrum, namely, red, green and blue-violet, by said continuous movement of the spectrum, the said scannings in the said three colors being completed during the time period of the persistence of vision.

LE ROY J. LEISHMAN.